US007975188B2

(12) United States Patent
Saito

(10) Patent No.: US 7,975,188 B2
(45) Date of Patent: Jul. 5, 2011

(54) RESTORATION DEVICE FOR BIOS STALL FAILURES AND METHOD AND COMPUTER PROGRAM PRODUCT FOR THE SAME

(75) Inventor: Takanobu Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 381 days.

(21) Appl. No.: 12/046,994

(22) Filed: Mar. 12, 2008

(65) Prior Publication Data
US 2008/0229158 A1 Sep. 18, 2008

(30) Foreign Application Priority Data

Mar. 13, 2007 (JP) ................................ 2007-063428

(51) Int. Cl.
*G06F 11/00* (2006.01)
(52) U.S. Cl. ........................................................ 714/55
(58) Field of Classification Search .................... 714/36, 714/51, 55
See application file for complete search history.

(56) References Cited

U.S. PATENT DOCUMENTS

| 5,864,656 | A * | 1/1999 | Park ................................. 714/10 |
| 6,185,696 | B1 * | 2/2001 | Noll ................................... 714/6 |
| 6,587,966 | B1 * | 7/2003 | Chaiken et al. .................. 714/34 |
| 7,318,173 | B1 * | 1/2008 | Falik et al. ....................... 714/36 |
| 2003/0005275 | A1 * | 1/2003 | Lam .................................. 713/2 |
| 2003/0005277 | A1 * | 1/2003 | Harding et al. ................... 713/2 |
| 2003/0084381 | A1 * | 5/2003 | Gulick ............................ 714/47 |
| 2003/0204792 | A1 * | 10/2003 | Cahill et al. .................... 714/55 |
| 2005/0015633 | A1 * | 1/2005 | Kang ............................. 713/300 |
| 2005/0278526 | A1 * | 12/2005 | Dunstan ......................... 713/165 |
| 2006/0020856 | A1 * | 1/2006 | Anuez et al. ..................... 714/25 |
| 2008/0104701 | A1 * | 5/2008 | Peacock et al. ................. 726/22 |
| 2008/0276132 | A1 * | 11/2008 | Majewski et al. ............... 714/55 |

FOREIGN PATENT DOCUMENTS

| JP | 59158454 A | 9/1984 |
| JP | 1984200357 A | 11/1984 |
| JP | 1992205152 A | 7/1992 |
| JP | 05046439 A | 2/1993 |
| JP | 2002189615 A | 7/2002 |
| JP | 2002251300 A | 9/2002 |
| JP | 2004038529 A | 2/2004 |
| JP | 2004086520 A | 3/2004 |
| JP | 2005122424 A | 5/2005 |
| JP | 2006252388 A | 9/2006 |

OTHER PUBLICATIONS

Japanese Office Action for JP 2007-063428 dated Jan. 21, 2009.

* cited by examiner

*Primary Examiner* — Bryce P Bonzo

(57) ABSTRACT

A restoration device for restoring a system when the BIOS falls in a stall failure includes a first watchdog timer and a second watchdog timer, a setter for setting timer values respectively in the first watchdog timer and in the second watchdog timer, a suspender for suspending the decrement of the timer value of the first watchdog timer when the BIOS is started and also execution of a BIOS process is started, a switch for switching the BIOS data region for starting when the timer value of the first watchdog timer becomes equal to 0 or a prescribed number, a resetter for resetting the system when the timer value of the first watchdog timer becomes equal to 0 or a prescribed number, a suspender for suspending the decrement of the timer value of the second watchdog timer when the BIOS of the system starts and a resetter for resetting the system when the timer value of the second watchdog timer becomes equal to 0 or a prescribed number.

9 Claims, 5 Drawing Sheets

RESTORATION DEVICE FOR BIOS STALL FAILURES AND METHOD AND COMPUTER PROGRAM PRODUCT FOR THE SAME

This application is based upon and claims the benefit of priority from Japanese patent application No. 2007-063428, filed on Mar. 13, 2007, the disclosure of which is incorporated herein in its entirety by reference.

BACKGROUND OF THE INVENTION

1. Field of the Invention

The present invention relates to a restoration device for BIOS stall failures and a method and a computer program product for the same. More particularly, the present invention relates to a restoration device for restoring a BIOS when the BIOS cannot start with a reduced restoration time and a high restoration probability and a method and a computer program product for the same.

2. Description of the Related Art

A watchdog timer is used in ordinary computers for the purpose of monitoring a system halt such as a system stall.

A timer value is set in advance in a watchdog timer and the timer value is decremented as time passes.

However, the decrement of the timer value is suspended as a result of execution of a system program when the processing operation of a BIOS (basic input/output system) progresses without any problem.

On the other hand, the timer is not stopped when a stall failure arises to the system. Then, time out takes place and a reset signal is issued when the timer value gets to 0 or a prescribed number.

Normally, only a single watchdog timer is provided to monitor a BIOS stall and a reset signal is issued at time out.

Therefore, when a BIOS cannot be started and is desirably reset quickly, the timer value gets to 0 or a prescribed number after a while as in the case of occurrence of a stall failure during a processing operation of the BIOS and a standby status takes place until the BIOS is reset.

When the data region of the BIOS is destroyed and the BIOS cannot be started any longer, it cannot be restarted and the system can no longer be restored.

To cope with this problem, JP-A-2002-251300 describes a technique of using watchdog timers of three different types.

The timer values of the watchdog timers are differentiated in terms of progress and the timer reading takes less time to progress in the order of the first watchdog timer, the second watchdog timer and the third watchdog timer.

When the software stalls, a restoration process is attempted by a software program when the timer value of the first watchdog timer gets to 0 or a prescribed number and time out takes place.

If the software cannot be restored, a system reset signal is issued and a restoration process is attempted when time out of the second watchdog timer takes place.

If the software cannot be restored either, the system power supply is turned off when time out of the third watchdog timer takes place. Subsequently, the system power supply is turned on once again and a restoration process is attempted.

However, the above-described stall monitoring technique is accompanied by the following problems.

The first problem is that, since the system is being monitored from the viewpoint of seeing if the system has stalled in the course of a process or not, the system cannot be reset immediately if it cannot be started.

The second problem is that, since the system is restarted when trying to restore the system, the system cannot be restored if the BIOS data region is destroyed.

Therefore, it is the object of the present invention to provide a restoration device to be operated when a BIOS is in a stall failure that can quickly restore the BIOS if the BIOS is in a condition of being unable to start and a method and a computer program for the same.

SUMMARY OF THE INVENTION

According to the present invention, there is provided a restoration device for restoring a system when the BIOS falls in a stall failure, the device including:

a first watchdog timer and a second watchdog timer;

a setter for setting timer values respectively in the first watchdog timer and in the second watchdog timer;

a suspender for suspending the decrement of the timer value of the first watchdog timer when the BIOS is started and also execution of a BIOS process is started;

a switch for switching the BIOS data region for starting when the timer value of the first watchdog timer becomes equal to 0 or a prescribed number;

a resetter for resetting the system when the timer value of the first watchdog timer becomes equal to 0 or a prescribed number;

a suspender for suspending the decrement of the timer value of the second watchdog timer when the OS of the system starts; and a resetter for resetting the system when the timer value of the second watchdog timer becomes equal to 0 or a prescribed number.

In addition, according to the present invention, there is provided a method of restoring a system when the BIOS falls in a stall failure, the method including:

preparing a first watchdog timer and a second watchdog timer;

setting timer values respectively in the first watchdog timer and in the second watchdog timer;

suspending the decrement of the timer value of the first watchdog timer when the BIOS is started and also execution of a BIOS process is started;

switching the BIOS data region for starting when the timer value of the first watchdog timer becomes equal to 0 or a prescribed number;

resetting the system when the timer value of the first watchdog timer becomes equal to 0 or a prescribed number;

suspending the decrement of the timer value of the second watchdog timer when the OS of the system starts; and resetting the system when the timer value of the second watchdog timer becomes equal to 0 or a prescribed number.

Further, according to the present invention, there is provided a computer program product recording a program for causing a computer to execute a method of restoring a system when the BIOS falls in a stall failure, the method including:

preparing a first watchdog timer and a second watchdog timer;

setting timer values respectively in the first watchdog timer and in the second watchdog timer;

suspending the decrement of the timer value of the first watchdog timer when the BIOS is started and also execution of a BIOS process is started;

switching the BIOS data region for starting when the timer value of the first watchdog timer becomes equal to 0 or a prescribed number;

resetting the system when the timer value of the first watchdog timer becomes equal to 0 or a prescribed number;

suspending the decrement of the timer value of the second watchdog timer when the OS of the system starts; and resetting the system when the timer reading of the second watchdog timer becomes equal to 0 or a prescribed number.

DETAILED DESCRIPTION OF THE PREFERRED EMBODIMENTS

Now, the present invention will be described in greater detail by referring to the accompanying drawings that illustrate preferred embodiments of the invention.

First Embodiment

Figure 1:
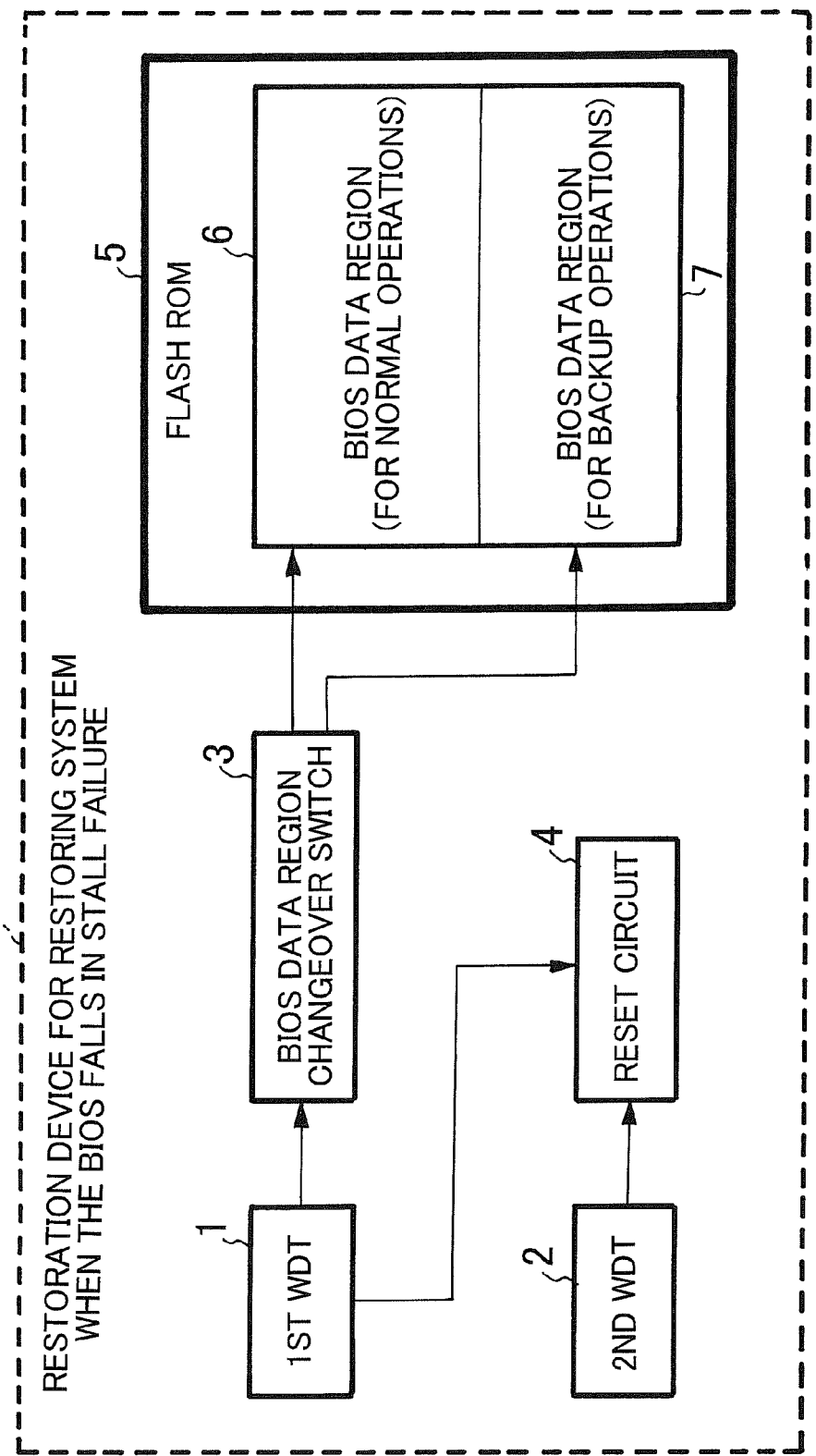
FIG. 1 is a schematic block diagram of the first embodiment of device according to the present invention, showing the basic configuration thereof.

The first embodiment of the present invention will be described by referring to FIG. 1 that illustrate the basic configuration of the embodiment.

A restoration device 8 for restoring a system when the BIOS falls in a stall failure of the first embodiment of the present invention includes a first watchdog timer 1, a second watchdog timer 2, a BIOS data region changeover switch 3, a reset circuit 4 and a FLASH ROM 5 that is a nonvolatile memory.

The FLASH ROM 5 has two BIOS data regions including BIOS data region 6 and BIOS data region 7.

The BIOS data region 6 is a region storing data to be used for starting the BIOS for normal operations.

The BIOS data region 7 is a region storing data to be used for starting BIOS for backup operations.

When time out takes place, the first watchdog timer 1 resets the operation of the restoration device 8 for restoring a system by way of the reset circuit 4 when the BIOS falls in a stall failure and, at the same time, directs the BIOS data region changeover switch 3 so as to switch from the data region 6 to be used for normal operations to the data region 7 to be used for backup operations and start the BIOS.

The second watchdog timer 2 resets the restoration device 8 for restoring a system by way of the reset circuit 4 when the BIOS falls in a stall failure when time out takes place.

As described above, two watchdog timers are provided. When the power source of the system is turned on, the predefined initial values are set respectively as the timer values of the two watchdog timers.

Then, countdown starts at each of the watchdog timers by a means for decrementing the timer value with time.

The countdown of each of the watchdog timers can be suspended by executing a suspension process while the BIOS is operating.

However, the operation of the timers are not suspended and time out takes place when the BIOS falls in a failure for some reason or another and the ongoing process of the BIOS is interrupted.

The first watchdog timer 1 is operated to monitor if the initial diagnostic program stored in the BIOS can be started or not in the initial stages of the process execution of the BIOS.

It is sufficient for the timer value of the first watchdog timer 1 to be about 1 second, although the value of 1 second is an example and any desired value may alternatively be selected as timer value of the first watchdog timer.

A process of suspending the decrement of the timer value of the first watchdog timer 1 is incorporated in the initial stages of the process execution of the BIOS.

If the BIOS cannot be started and the first watchdog timer 1 cannot be stopped, the timer value of the first watchdog timer is reduced to 0 or a prescribed number when 1 second elapses since the power source is turned on and time out takes place.

Then, a reset signal is issued.

Additionally, the BIOS region is switched from the BIOS data region 6 to the BIOS data region 7 at the backup side.

Now, the second watchdog timer 2 is employed to monitor if the ongoing process of the BIOS is stalled on the way or not and the timer value of the second watchdog timer 2 is set to a value greater than the time to be spent from the start to the end of the operation of the BIOS.

A process of stopping the second watchdog timer 2 is incorporated in the final stages of the process execution of the BIOS.

However, if the ongoing process of the BIOS stalled on the way and the second watchdog timer 2 cannot be stopped, time out takes place the moment when the timer value becomes equal to 0 or a prescribed number from the set value.

Then, a reset signal is issued as in the case where time out takes place at the first watchdog timer 1.

Thus, according to the present invention, the restoration process is different between when the BIOS cannot be started at all and when the BIOS can be started but stalls sometime in the ongoing process.

When the BIOS cannot be started, time out takes place at the first watchdog timer 1 in about 1 second so that a reset signal is used very quickly.

As a reset signal is issued, the BIOS region to be used for normal operations is switched to the BIOS region to be used for backup operations so that the BIOS can be restored when the BIOS region for ordinary operations is destroyed and the BIOS cannot be started.

Now, the operation of the watchdog timers according to the embodiment of the present invention will be described below by referring to the flowchart of FIG. 2.

Firstly, power is supplied from the power source to the restoration device 8 for restoring a system when the BIOS falls in a stall failure (S10).

Then, the BIOS data region 6 for normal operations is set to work as BIOS data region (S11).

Then, the system is initialized once (S12).

Thereafter, the first watchdog timer 1 and the second watchdog timer 2 (denoted by the first WDT and the second WDT in the drawings) are set to show the respective initial values as timer values. In this embodiment, it is assumed that the set initial timer value of the first WDT is A seconds and that of the second WDT is B seconds (S13).

Note that, as pointed out above in the description of the configuration of this embodiment, the first watchdog timer 1 is operated only to monitor if the BIOS can be started or not. Therefore, it is sufficient for the initial timer value of the first watchdog timer to be about 1 second.

This is because, if the BIOS is not started to operate after waiting for 1 second or longer, the BIOS will highly probably not be started to operate after waiting for a longer time period.

Therefore, it is more preferable to initialize the system quickly than to wait for further.

The concept of the time A will be described by referring to the conceptual illustration of FIG. 3.

The time A is decremented from the time when the BIOS process is operated for a start (S20) to the time when the BIOS process is actually started. If a process of stopping the first WDT is executed before the timer value gets to 0 or a prescribed number (S21), time out does not take place at the WDT and the BIOS process proceeds to the next step (S22).

If, on the other hand, the second watchdog timer 2 is operated to monitor if the ongoing process of the BIOS is stalled on the way or not.

The initial set value B of the second watchdog timer 2 is set to a value greater than the time to be spent from the start to the end of the operation of the BIOS.

The concept of the time B of the second watchdog timer 2 to be set as initial set value will be described below by referring to the conceptual illustration of FIG. 3.

The value of the time B is decremented from the time when the BIOS process is operated for a start (S20) all the way the execution of the BIOS process to the time when the BIOS process ended and then the OS (operating system) is booted (S24).

If a process of stopping the second WDT is executed before the timer value gets to 0 or a prescribed number (S23), no VDT time out takes place and the process proceeds to the next step (S24).

Now, the operation of the embodiment will be described further. The first watchdog timer 1 and the second watchdog timer 2 are started to count down (S14, FIG. 2) and the BIOS is started from the specified BIOS data region (S15, FIG. 2).

Figure 3:
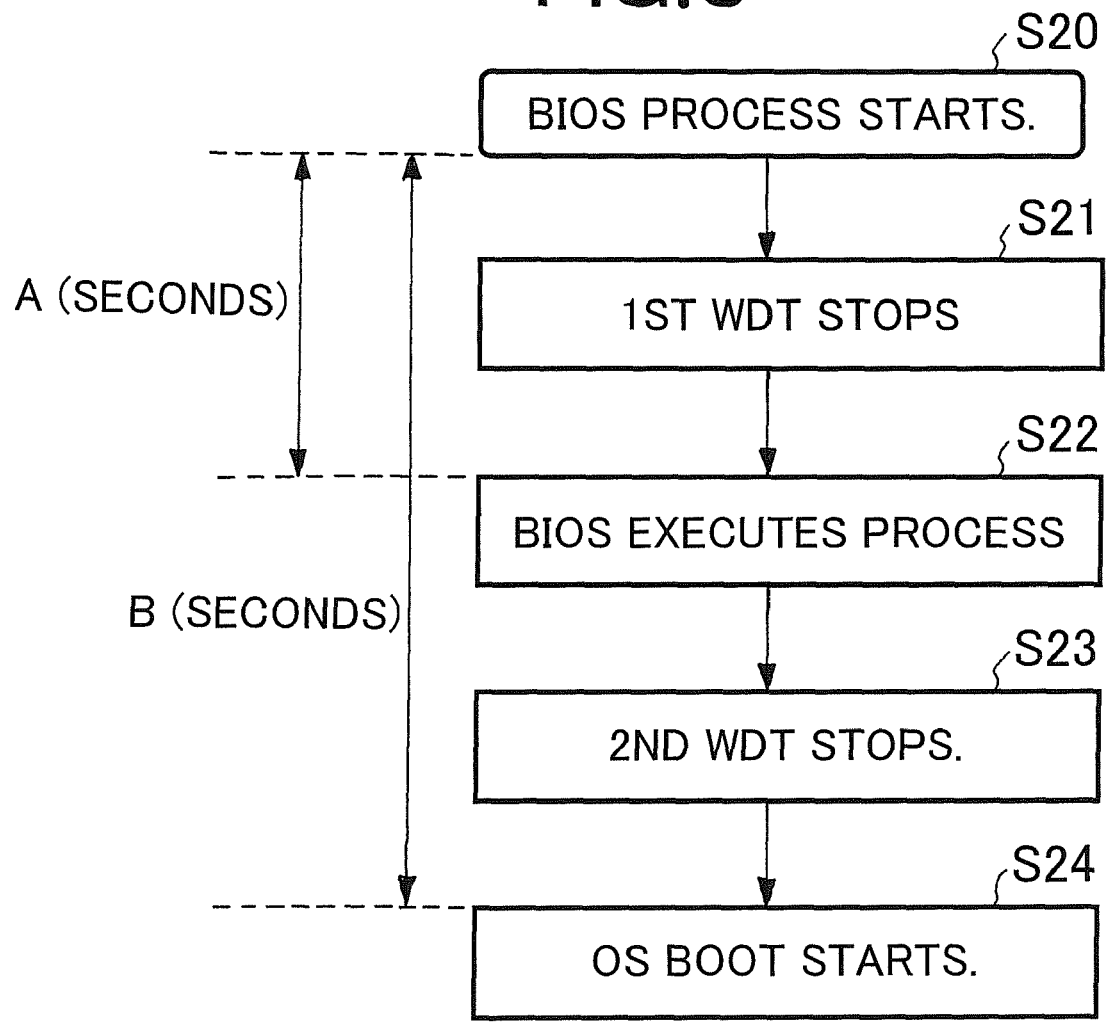
FIG. 3 is a schematic conceptual illustration of timer values according to the present invention.

When the BIOS can be started, the first watchdog timer 1 is stopped during the execution of the BIOS process (S21, FIG. 3).

Figure 2:
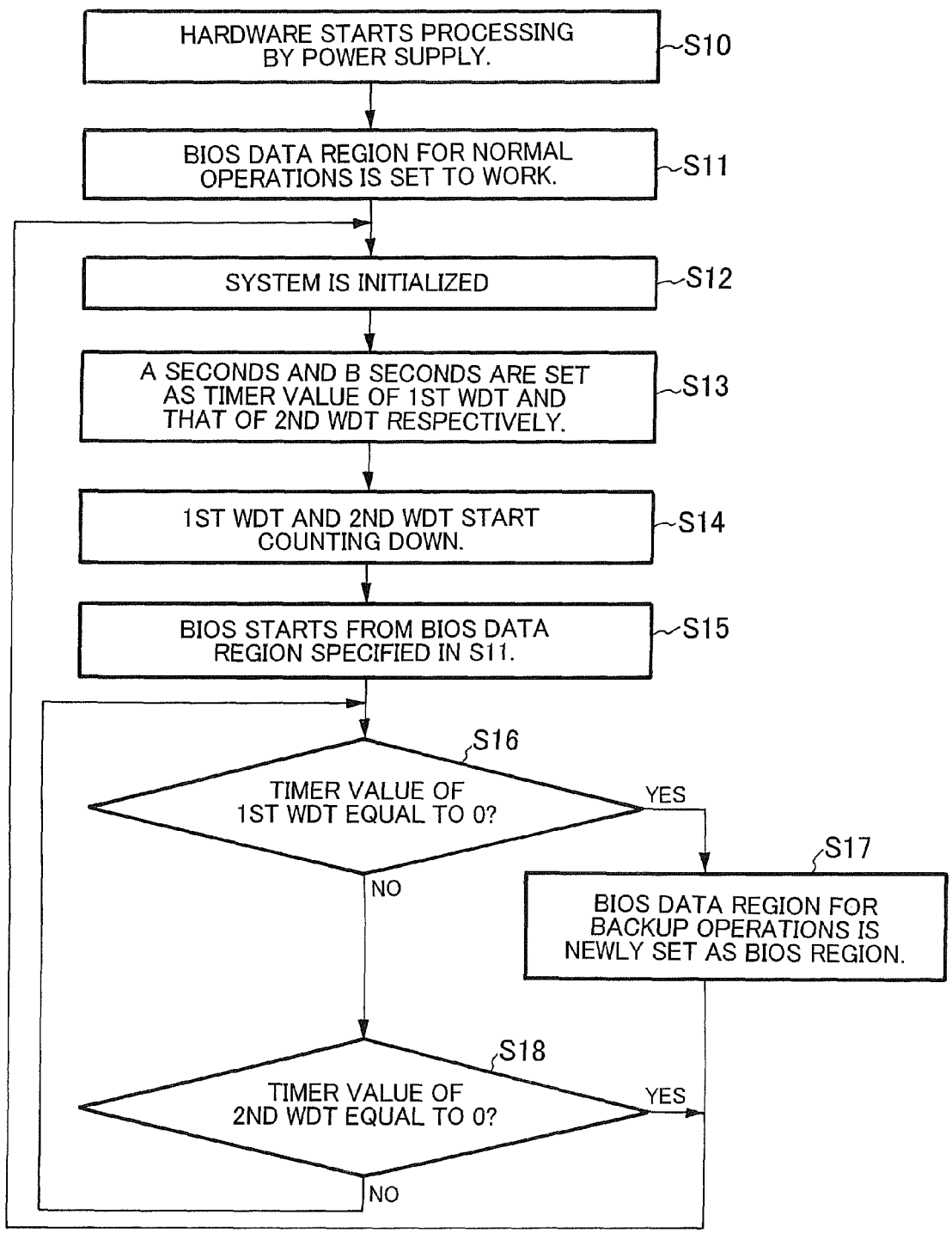
FIG. 2 is a flowchart of the operation of the first embodiment of the present invention.

When, on the other hand, the BIOS cannot be started, the BIOS process itself cannot be executed so that the process of stopping the timer value is not executed for the first watchdog timer 1 and hence time out takes place (S16, FIG. 2).

Since the BIOS data region is destroyed, it makes no sense to try to start the BIOS from the same BIOS data region. Therefore, the backup BIOS data region 7 is set to operate as BIOS data region (S17, FIG. 2).

The system is initialized to execute the BIOS process by means of the data stored in the BIOS data region 7 (S12, FIG. 2).

Subsequently, the BIOS executes the various processing steps (S22, FIG. 3).

After all the BIOS process ends and the OS is booted, the BIOS stops the second watchdog timer 2 (S23, FIG. 3).

If the BIOS stalls on the way of executing any of the various processing steps, the BIOS cannot execute the process of stopping the second watchdog timer 2 and time out takes place at the second watchdog timer 2 (S17, FIG. 2).

Then, a system reset signal is issued to try to execute the BIOS process once again (S12, FIG. 2).

Second Embodiment

Figure 4:
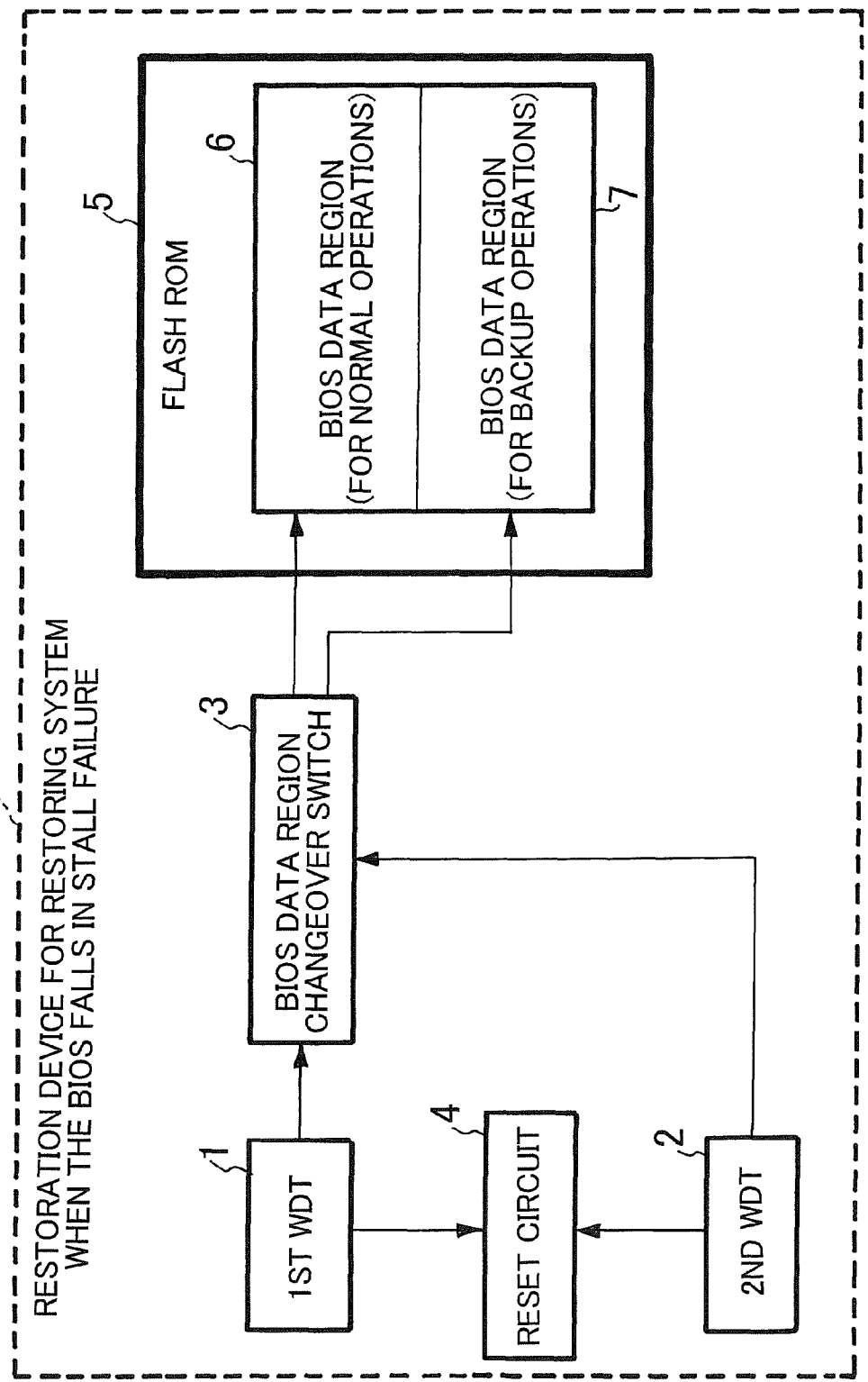
FIG. 4 is a schematic block diagram of the second embodiment of device according to the present invention, showing the basic configuration thereof.

While the second embodiment has a basic configuration same as the above-described embodiment, the operation of the second watchdog timer 2 is modified. This embodiment will be described by referring to FIG. 4.

This embodiment is so designed as to start the BIOS by directing the BIOS data region changeover switch 3 to switch to the backup BIOS data region 7 when time out takes place at the second watchdog timer 2.

Alternatively, it may be so arranged that a reset process is executed when time out takes place for the first time at the second watchdog timer 2 and a reset process is executed and the BIOS region is switched when time out takes place successively for a plurality of times (e.g., twice).

Thus, with this embodiment, the operation of the BIOS switches to the backup BIOS data region 7 when the BIOS is stalled as a result of partial destroy of the BIOS data.

Therefore, this embodiment provides an advantage that the BIOS can be restored when the BIOS region for normal operations is destroyed but the BIOS can be started to execute the process somewhere on the way, although the process cannot be completed.

Third Embodiment

Figure 5:
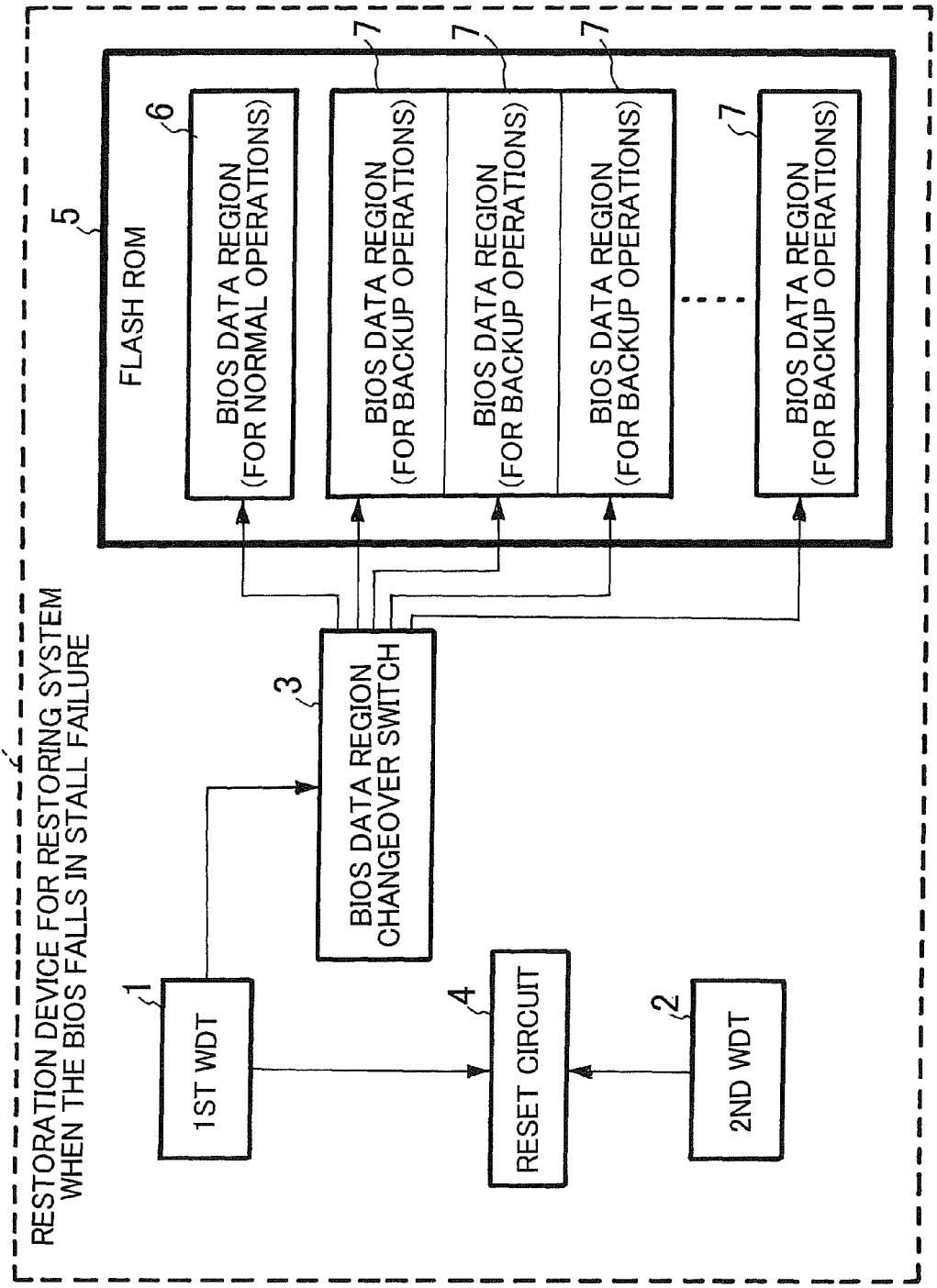
FIG. 5 is a schematic block diagram of the third embodiment of device according to the present invention, showing the basic configuration thereof.

FIG. 5 illustrates still another embodiment of the invention, or the third embodiment. This embodiment is provided with a plurality of backup BIOS data regions 7.

Thus, as a result, if there arises a situation where the BIOS data region 6 is destroyed and the BIOS data region for starting the BIOS is switched to the BIOS data region 7 but one of the BIOS data regions 7 is also destroyed, this embodiment can accommodate such a situation and keep the BIOS operable.

The device for restoring a BIOS when the system falls in a stall failure according to the present invention can be realized by means of hardware, software, or a combination thereof.

The above embodiments of the present invention provide the following advantages.

The first advantage is that they have two watchdog timers so that they can accommodate two different situations including a situation where the BIOS cannot be started at all and a situation where the BIOS falls in a stall failure during the BIOS process by executing different processes to the respective situations.

The second advantage is that time out takes place quickly at one of the watchdog timers when the BIOS cannot be started so that the time until a reset signal is issued is reduced.

The third advantage is that the BIOS region that is used after a reset signal is issued is switched from the destroyed BIOS region to the backup BIOS region when the BIOS cannot be started so that a situation where the BIOS region is destroyed and hence the BIOS cannot be started is avoided.

The present invention can find applications where it is preferable to selectively use different restoration methods depending the condition of stall of BIOS. Particularly, the present invention is advantageous to reduce the restoration time and raise the restoration probability when the BIOS cannot be started.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A restoration device for restoring a system when a BIOS falls in a stall failure, the system comprising an operating system, the BIOS comprising an initial diagnostic program, the restoration device comprising:
    a plurality of BIOS data regions, including a first BIOS data region configured to run the BIOS when a power source of the system is turned ON; and
    a first watchdog timer, a second watchdog timer, and a reset circuit;

wherein the system is initialized when the first BIOS data region is set or switched, and wherein the reset circuit functions as:
- a setter for setting a first timer value in the first watchdog timer and a second timer value in the second watchdog timer when the system is initialized;
- a starter configured to cause: (a) the first and second watchdog timers to start decrementing the first and second timer values, respectively, and (b) the BIOS to start operating, wherein:
  - the first watchdog timer times out if the first timer value becomes: (i) zero, or (ii) a first prescribed number, before the initial diagnostic program terminates, and
  - the second watchdog timer times out if the second timer value becomes: (i) zero, or (ii) a second prescribed number, before the BIOS terminates without stalling and the operating system is booted;
- a first switch configured to switch the first BIOS data region to another BIOS data region when the first watchdog timer times out;
- a first suspender for suspending decrement of the first timer value when the initial diagnostic program terminates;
- a second suspender for suspending decrement of the second timer value when the operation of the BIOS terminates; and
- a resetter configured to initialize the system when the second watchdog timer times out.

2. The restoration device according to claim 1, further comprising:
a second switch configured to switch the first BIOS data region to another BIOS data region when the second watchdog timer times out.

3. The restoration device according to claim 2, wherein the second switch operates when the second watchdog timer times out for a plurality of times.

4. A method for restoring a system when a BIOS falls in a stall failure, the system comprising an operating system, the BIOS comprising an initial diagnostic program, the method comprising:
providing a plurality of BIOS data regions, including a first BIOS data region configured to run the BIOS when a power source of the system is turned ON;
setting a first timer value in the first watchdog timer and a second timer value in the second watchdog timer when the system is initialized;
causing: (a) the first and second watchdog timers to start decrementing the first and second timer values, respectively, and (b) the BIOS to start operating, wherein:
the first watchdog timer times out if the first timer value becomes: (i) zero, or (ii) a first prescribed number, before the initial diagnostic program terminates, and
the second watchdog timer times out if the second timer value becomes: (i) zero, or (ii) a second prescribed number, before the BIOS terminates without stalling and the operating system is booted;
switching the first BIOS data region to another BIOS data region when the first watchdog timer times out;
suspending decrement of the first timer value when the initial diagnostic program terminates;
suspending decrement of the second timer value when the operation of the BIOS terminates; and
initializing the system when the second watchdog timer times out.

5. The method of claim 4, further comprising:
switching the first BIOS data region to another BIOS data region when the second watchdog timer times out.

6. The method of claim 5, wherein switching the first BIOS data region comprises switching the first BIOS data region to another BIOS data region when the second watchdog time times out for a plurality of times.

7. A computer program product recording a program for causing a computer to execute a method of restoring a system when the BIOS falls in a stall failure, the system comprising an operating system, the BIOS comprising an initial diagnostic program, the method comprising:
providing a plurality of BIOS data regions, including a first BIOS data region configured to run the BIOS when a power source of the system is turned ON;
setting a first timer value in the first watchdog timer and a second timer value in the second watchdog timer when the system is initialized;
causing: (a) the first and second watchdog timers to start decrementing the first and second timer values, respectively, and (b) the BIOS to start operating, wherein:
the first watchdog timer times out if the first timer value becomes: (i) zero, or (ii) a first prescribed number, before the initial diagnostic program terminates, and
the second watchdog timer times out if the second timer value becomes: (i) zero, or (ii) a second prescribed number, before the BIOS terminates without stalling and the operating system is booted;
switching the first BIOS data region to another BIOS data region when the first watchdog timer times out;
suspending decrement of the first timer value when the initial diagnostic program terminates;
suspending decrement of the second timer value when the operation of the BIOS terminates; and
initializing the system when the second watchdog timer times out.

8. The computer program product according to claim 7, wherein said method further comprises:
switching the first BIOS data region to another BIOS data region when the second watchdog timer times out.

9. The computer program product according to claim 8, wherein switching the first BIOS data region comprises switching the first BIOS data region to another BIOS data region when the second watchdog time times out for a plurality of times.

* * * * *